Oct. 25, 1932.  C. F. McEWAN  1,884,052
CAN WASHING MACHINE
Filed Jan. 30, 1930   7 Sheets-Sheet 1

Fig. 1

Witnesses:
Inventor:
Charles F. McEwan,
By Joshua R. H. Potts
His Attorney.

Oct. 25, 1932.  C. F. McEWAN  1,884,052
CAN WASHING MACHINE
Filed Jan. 30, 1930   7 Sheets-Sheet 2

Fig. 2

Witnesses:
C. E. Wessels
Oscar —

Inventor:
Charles F. McEwan,
By Joshua R. H. Potts
His Attorney

Oct. 25, 1932.  C. F. McEWAN  1,884,052
CAN WASHING MACHINE
Filed Jan. 30, 1930   7 Sheets-Sheet 6

Patented Oct. 25, 1932

1,884,052

UNITED STATES PATENT OFFICE

CHARLES F. McEWAN, OF CHICAGO, ILLINOIS, ASSIGNOR TO HARRY D. LATHROP, OF CHICAGO, ILLINOIS

CAN WASHING MACHINE

Application filed January 30, 1930. Serial No. 424,514.

This invention relates to can washing machines, and an object is to provide a machine of this type having increased efficiency and durability, as well as adaptability, to meet different conditions of service. A more specific object is the provision of a machine of this type in which cans, such as milk cans, are successively subjected to various cleansing operations, and in which not only is the machine automatically arrested periodically for the various cleansing operations, but the duration of each cleansing operation may be selectively varied. A further object is to provide a machine of this character in which the cleansing operations as a whole are more efficiently accomplished than heretofore. As an additional object the invention aims to provide a machine in which novel features of operation are performed automatically. Other objects will appear hereinafter.

The invention consists in the combinations and arrangements of parts hereinafter described and claimed.

The invention will be best understood by reference to the accompanying drawings, forming a part of this specification, and in which.

Figure 1:
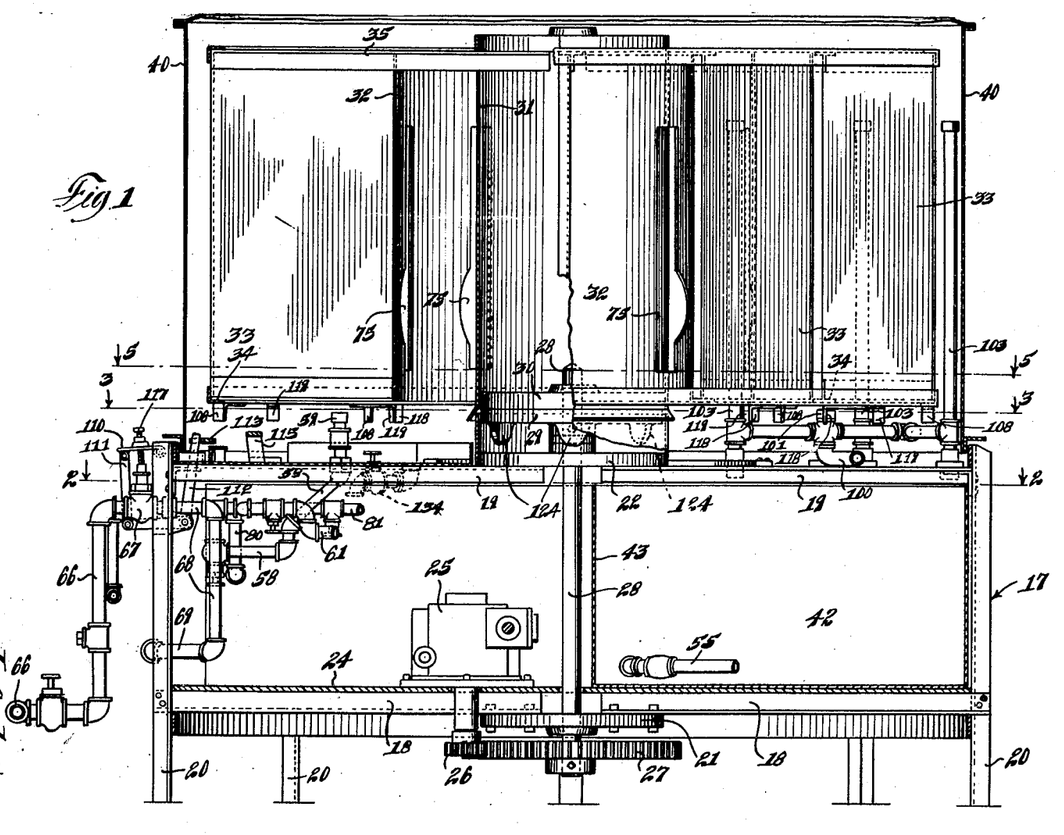
Fig. 1 is a vertical sectional view of the machine, taken substantially on the line 1—1 of Fig. 2.
Figures 7, 8, 9, 10, 11, 12:
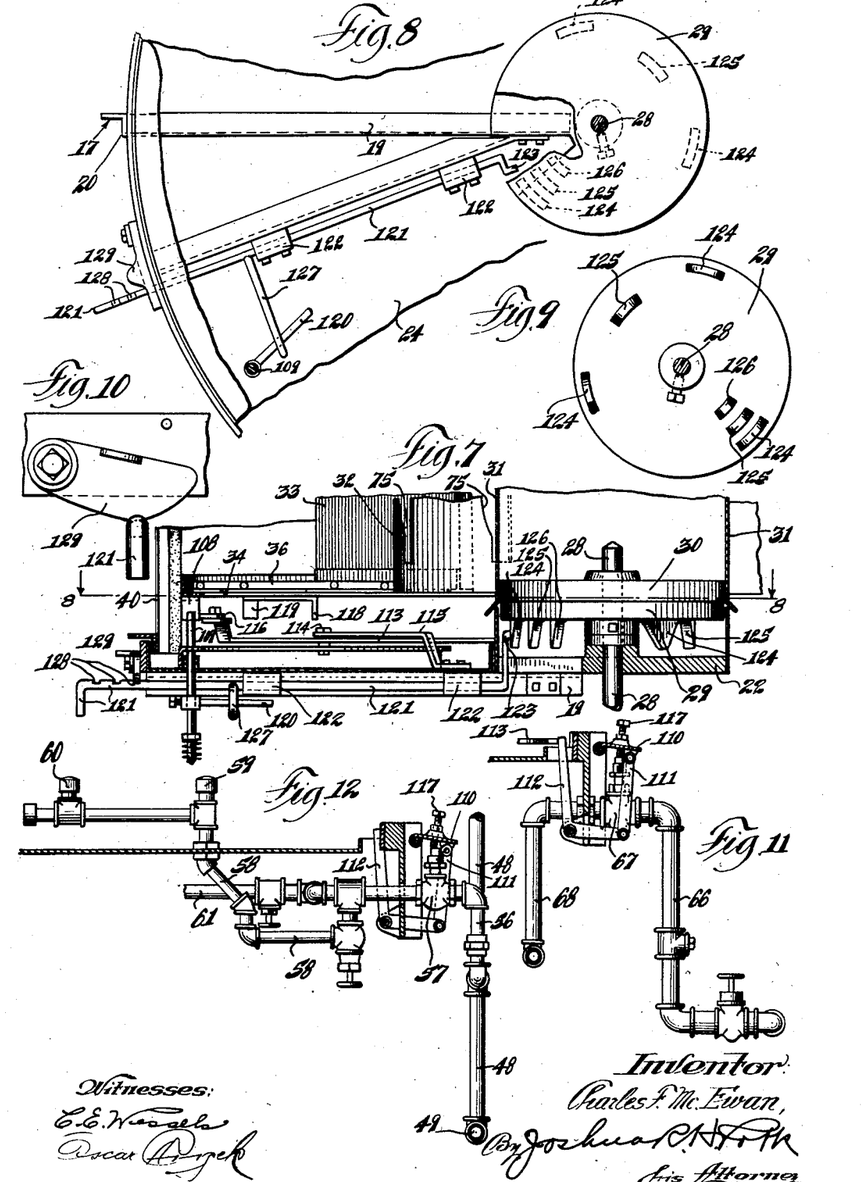
Fig. 7 is a vertical view, partly in section and partly in elevation, of the speed control mechanism.
Fig. 8 is a horizontal sectional view, taken substantially on the line 8—8 of Fig. 7.
Fig. 9 is an inverted face view of the driving disc, which also carries the speed control cams.
Fig. 10 is a detail view of the locking plate for the speed control operating rod.
Fig. 11 is a detail sectional view, taken substantially on the line 11—11 of Fig. 3, showing the steam supply pipe which leads from the lower end of the air heating radiator, and also the automatic valve control.
Fig. 12 is a detail vertical sectional view, taken substantially on the line 12—12 of Fig. 3, illustrating the steam supply line for the steam sterilizing operation, and also the automatic valve control.
Figures 13, 14:
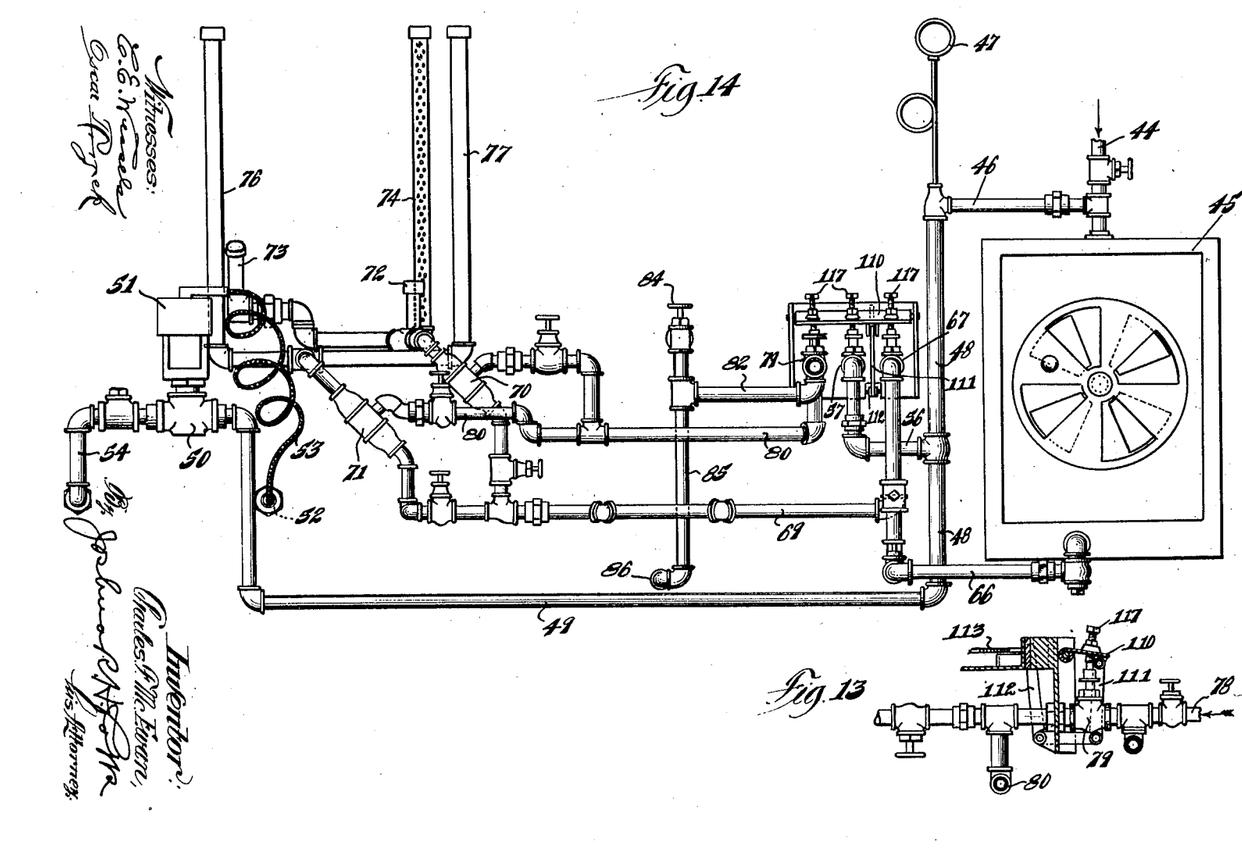
Fig. 13 is a detail sectional view, taken substantially on the line 13—13 of Fig. 3, illustrating the cold water supply line in conjunction with the automatic valve control.
Fig. 14 is a diagrammatic elevational view, showing the general piping arrangement shown in Fig. 3.

The preferred embodiment of the machine illustrated is in the form of a so-called rotary type machine, having a stationary supporting base and a superposed rotary can carriage adapted to convey the cans through the machine to receive the successive cleasing operations. As illustrated, the machine comprises a base having lateral supports 17, a plurality of radially extending lower brace members 18, and a plurality of upper radially extending brace members 19. Members 17 preferably extend downwardly a sufficient distance to provide supporting legs 20, and secured to the inner ends of brace members 18 is a bearing plate 21. Similarly secured to the inner extremities of members 19 is a bearing plate 22. These bearing plates serve not only as part of the base structure, but also as journals for the drive shaft, as presently explained. A drive motor is mounted upon a transverse supporting plate 24 and is adapted to operate with a reduction gearing assembly 25, from which extends a shaft carrying drive pinion 26 adapted to mesh with drive gear 27, as best shown in Fig. 1. Drive gear 27 is keyed upon drive shaft 28, which extends vertically through bearing or journal plates 21 and 22, and has keyed thereto adjacent its upper end a friction driving disc 29. As shown in Fig. 7, drive shaft 28 rotates loosely within a driven disc 30 which is disposed in frictional engagement with driving disc 29. Driven disc 30 is adapted to support the rotary can carriage, as presently described, and this construction and arrangement permits of continued rotation of the can carriage except at such times as the rotation is arrested to permit of cleansing operations, and at such periods of rest of the can carriage the drive shaft and driving disc 29 may continue in rotation.

Figures 5, 6:
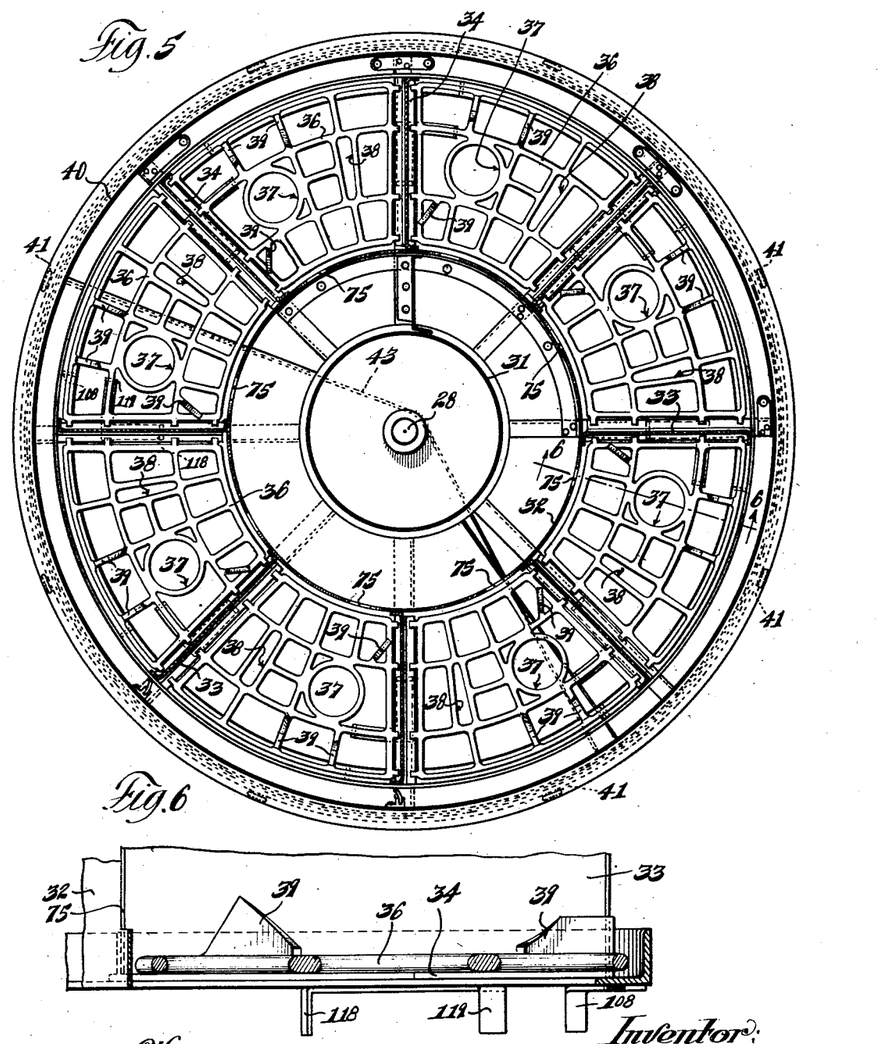
Fig. 5 is a horizontal sectional view, taken substantially on the line 5—5 of Fig. 1.
Fig. 6 is an enlarged detail sectional view, taken substantially on the line 6—6 of Fig. 5.

The rotary can carriage supported by the driven disc 30 preferably has an inner cylindrical wall 31 and a second cylindrical wall 32 spaced outwardly therefrom. The carriage is divided into a plurality of radial compartments formed by a plurality of radially extending partitions 33. Supporting angle ribs 34 extend outwardly from the lower portion of the carriage, and corresponding upper brace ribs 35 extend outwardly adjacent the upper end of the carriage. Each compartment is provided with a can and cover supporting grate 36 having a can registering opening 37 and cover registering openings 38, as shown in Fig. 5. Also as shown, these supporting grates are preferably adapted to rest upon the radially extending rib members 34 so as to be readily removable for cleansing or replacement. Each grate 36 is also preferably provided with three centering plates 39, as shown in Figs. 5 and 6, and these plates have inner downwardly inclined surfaces adapted to engage the neck of a can so that when the can is placed upon a grate by the workman the neck will automatically center over the opening 37.

Figure 2:
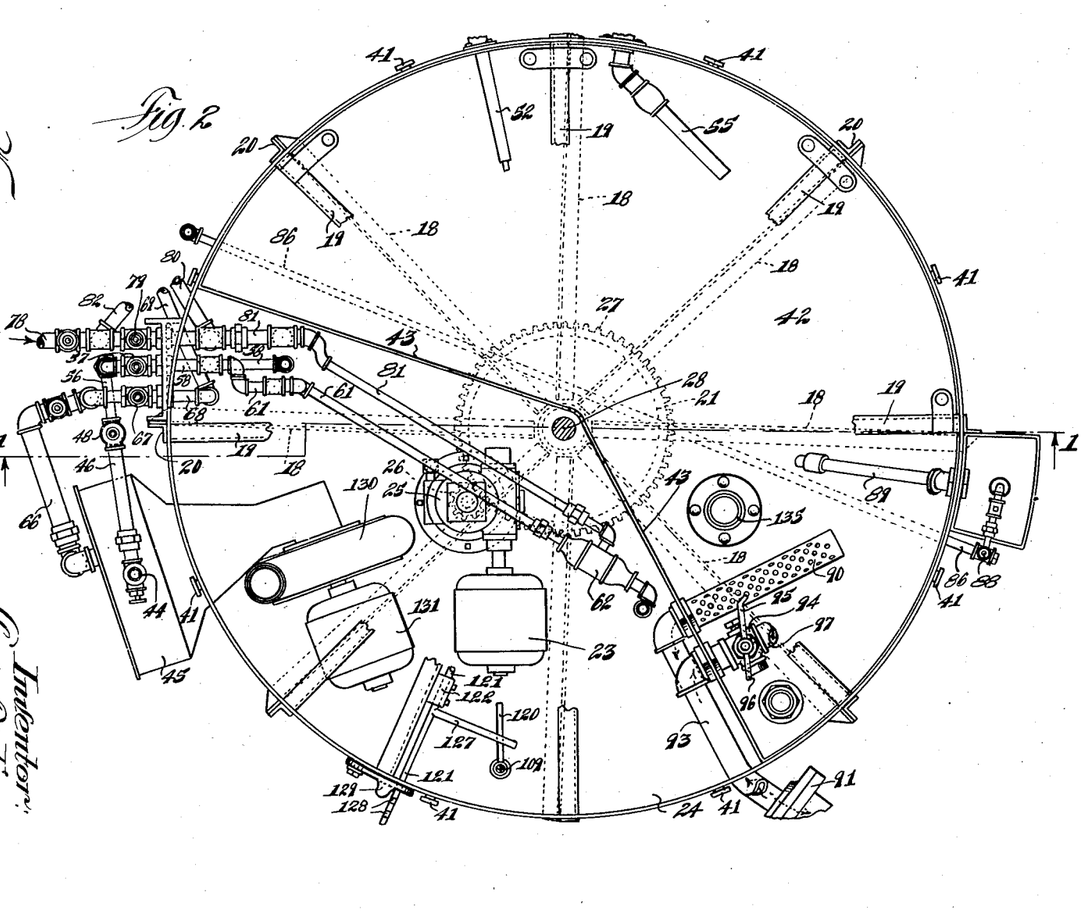
Fig. 2 is a horizontal sectional view, taken substantially on the line 2—2 of Fig. 1.

The entire carriage is inclosed by a cylindrical hood 40, which entirely incloses the carriage except for a door or opening adjacent the loading and unloading station, and hood 40 preferably rests upon a plurality of rollers 41 mounted circumferentially upon the base, which permits of manual rotation of the hood for access to the various parts of the machine. The major portion of the lower supporting base is taken up by a soda solution tank 42, bounded by an outer cylindrical wall and two radial walls 43, as shown in Fig. 2.

In the present embodiment of the invention, the cans and covers as they are transported through the machine by the rotary carriage, are subjected to a number of cleansing operations, which include a preliminary lukewarm water rinse, three soda solution cleansing washes, then a hot water rinse, followed by a steam sterilizing bath, and a final hot air drying operation. Previously these cleansing operations have varied in character, duration and number, and the present invention also contemplates a perfected sequence and character of cleansing operations whereby the can is most efficiently and thoroughly cleansed without any excess or unnecessary operations.

A main steam supply pipe 44 is connected to the upper portion of radiator 45, and also has a branch pipe 46 connected to a steam gauge 47 having a downwardly extending branch 48. The lower branch pipe 49 leading from pipe 48 extends transversely to a valve 50, operable by a thermostatic valve control 51 responsive to thermostatic element 52 disposed within the soda solution tank and connected to valve control 51 by wire 53. From valve 50 the steam is carried through pipe 54 to a steam discharge pipe 55 disposed within the soda solution tank. Thus it will be seen that the supply of steam to the soda solution is under the control of the thermostatic elements 51 and 52 and valve 50, whereby the desired temperature of the solution may be maintained constant. A second branch pipe 56 leads from downwardly extending branch pipe 48 through a central valve 57. After passing through valve 57 the steam is conveyed through pipes 58 to a can sterilizing steam discharge nozzle 59 and a cover sterilizing discharge nozzle 60. Also leading from valve 57 is a steam pipe 61 which extends transversely to a mixing injector 62, to which is also supplied water, as hereinafter described, in such manner that the temperature of the water will be raised to provide the preliminary warm water rinse furnished through pipe 63 leading from mixing injector 62 and therefrom to can discharge nozzle 64 and cover discharge nozzles 65.

Figure 3:
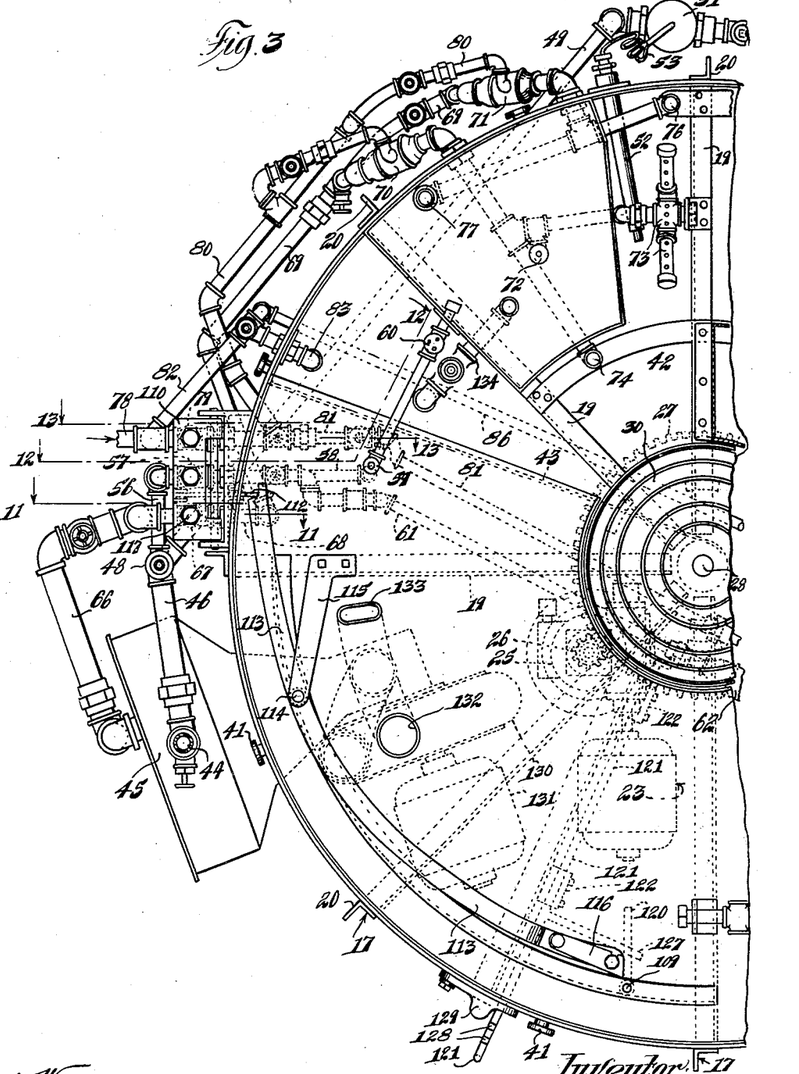
Figs. 3 and 4 are enlarged horizontal sectional views, taken substantially on the line 3—3 of Fig. 1.
Figure 4:
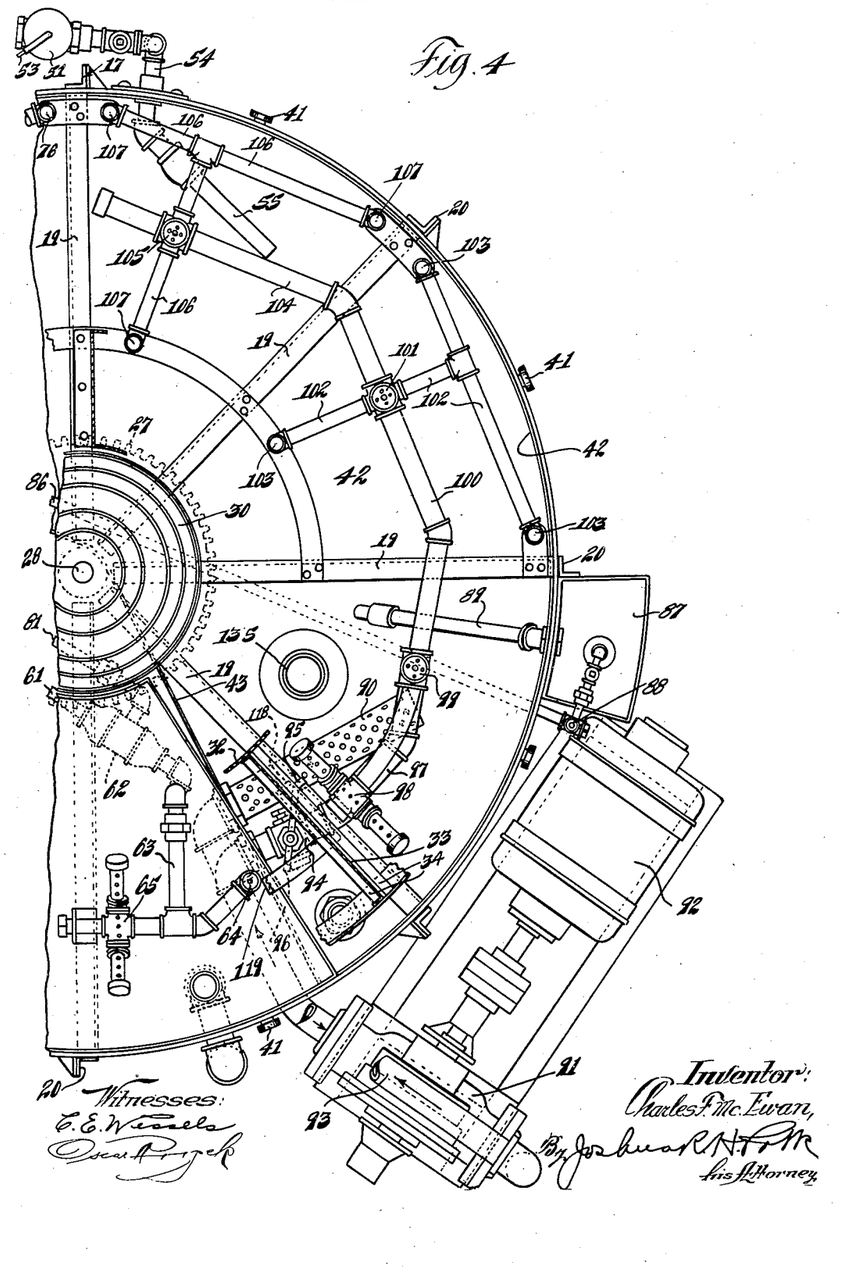

After passing through radiator 45, steam is conveyed through pipe 66 to valve 67 and thence through pipes 68 and 69 to mixing injectors 70 and 71. These injectors also receive a supply of cold water, as hereinafter explained, and the steam supply serves to raise the temperature sufficiently high to form a hot water rinse for the cans and covers following the several soda solution washes heretofore mentioned. As shown in Fig. 3, mixing injector 70 is adapted to supply a can spraying nozzle 72, cover spraying nozzle 73, and a vertically extending spray pipe 74 which is adapted to spray hot water upon the exterior of one portion of the can. Referring again to Fig. 1, the outer wall 32 is provided adjacent each can compartment with a vertically extending slot 75, and during each arresting operation of the can carriage the slot in the compartment which is adjacent the hot water rinse registers with vertically extending spray pipe 74, permitting the spray of hot water through the slot. Mixing injector 71 supplies hot water to vertically extending spray pipes 76 and 77 adapted to spray hot water upon the remaining exterior portions of the can, and thus it will be seen by this construction and the connections used, a thorough interior and exterior hot water rinse of the can is obtained. As further shown in the various views, the pipes are supplied at appropriate places with hand valves.

A main cold water supply from any suitable source is received through cold water supply pipe 78, which has a branch leading to valve 79. As shown in Figs. 2 and 3, valves 57, 67 and 79 are placed in juxtaposition, and these valves are preferably of the pop, or whistle, type. As presently explained, these valves are adapted to be operated in unison for supplying steam and water for the various cleansing and washing operations during each rest period of the can carriage. From valve 79 cold water is carried through pipe 80 to the mixing injectors 70 and 71, and also through pipe 81 to mixing injector 62. Before reaching valve 79 a branch pipe 82, leading from supply pipe 78, carries water to a filler pipe 83 operable by hand valve 84 for supplying water to the soda solution tank when needed, and branching from pipe 82 is a water supply pipe 85 which connects with a long pipe 86 extending substantially diametrically across the bottom of the machine to a soda receptacle 87, wherein caustic soda or other suitable cleansing agent may be contained. The supply of water to receptacle 87 is controlled by hand valve 88, and as the soda is mixed it is carried into the soda solution tank through overflow pipe 89. The soda solution is pumped from the soda solution tank 42 through strainer 90, by means of pump 91, operable by motor 92, through the soda solution supply pipe 93. Pipe 93 is connected to valve 94, which is preferably of the rotary stem type having an operating arm connected to the stem with an opening portion 95 and a closing portion 96. This valve is operable by means of lugs carried on the under surface of the carriage, as hereinafter explained. When the valve is in the so-called open position it permits the passage of soda solution through pipe 97, and the valve is provided with a by-pass whereby when in the so-called closed position the soda solution is diverted back into the soda solution tank. Thus it will be understood that the opening lug on the bottom of the can carriage, which contacts with arm 95, is in advance of the closing lug, which contacts with arm 96.

Pipe 97 leads to cover spraying nozzle 98, and to can spraying nozzle 99, which registers with the mouth of the can to spray the interior. Continuing from nozzle 99, pipe 100 connects with a second can spraying nozzle 101, from which leads branch pipes 102 which carry soda solution to vertically extending spray pipes 103 adapted to spray soda solution upon the exterior of the can. Continuing from spraying nozzle 101, pipe 104 connects with can spraying nozzle 105, which is correspondingly connected by branch pipes 106 to a second set of exterior can spraying pipes 107.

Beneath each can compartment and adjacent the outer edge of the can carriage is a stop lug 108. As the carriage rotates these lugs successively come in contact with a stop rod 109 which serves to hold the carriage in arrested position so as to permit of washing operations. The three fluid supply valves 57, 67 and 79 are operable by a pivotally mounted plate 110 which is connected by link 111 to bell crank 112. Bell crank 112 is adapted to be swung so as to lower plate 110, and thus open the three valves, by an elongated curved lever 113 pivotally mounted at 114 to a fulcrum bracket 115.

Referring now to Fig. 3, when a stop lug 108 comes in contact with the upper extremity of stop rod 109, the inner edge of the lug 108 contacts with shoe 116 mounted on lever 113 so as to hold the lever in position to maintain the three valves opened. The respective stems of valves 57, 67 and 79 preferably contact with adjustable bolts 117. Similarly disposed beneath each can compartment is a lug 118 adapted to contact with arm 95 of valve 94 to open the valve, and slightly to the rear of each lug 118 is a closing lug 119 adapted to contact with arm 96 of valve 94 when the carriage is released, in order to close valve 94. Stop rod 109 is normally spring-pressed upwardly and is provided with a laterally extending arm 120. A rest period control rod 121 is both slidably and rockably mounted upon the base of the machine in brackets 122, and is provided upon its inner extremity with an upwardly offset finger 123.

Referring to Fig. 9, the under surface of drive disc 29 is provided with three cams 124 which are not only of equal radius upon the disk, but are uniformly spaced circumferentially. There are likewise provided a pair of cams 125 which are diametrically opposite each other and positioned upon the disc at a slightly less radius than cams 124. A single cam 126 is positioned at a slightly less radius than cams 125. Referring to Fig. 7, control rod 121 is adjustable to three positions, in the first of which finger 123 will be successively engaged by cams 124. When control rod 121 is positioned at an intermediate point inwardly, finger 123 will be successively engaged by cams 125. In the final inward adjustable position, finger 123 will be engaged by cam 126. Thus it will be seen that three rest period ratios are provided. In the first or outer position, finger 123 is engaged three times during each rotation of the carriage. At the intermediate position finger 123 is engaged twice during each rotation of the carriage, and in the final adjusted position finger 123 is engaged once during each rotation of the carriage.

Extending laterally from control rod 121 is arm 127 adapted to contact with the upper surface of arm 120 mounted upon stop rod 109, and each time finger 123 is engaged by a cam upon disc 29 the rocking of rod 121 causes stop rod 109 to be depressed so as to permit the continued rotation of the carriage, by reason of the frictional engagement between the drive and driven discs. Speed control rod 121 is provided with a plurality of notches 128 engageable by a pivotally mounted plate 129 in the different positions of adjustment. When the carriage is in a position of rest, with lug 108 in contact with rod 109, the three steam and water supply valves 57, 67 and 79 are maintained in opened position, as above explained, and also soda solution valve 94 is held in opened position; but when the carriage is automatically released by the rocking of speed control rod 121, valves 57, 67 and 79 are closed, and valve 94 is also closed by a lug 119 mounted adjacent the compartment which was in position above the valve during the rest period.

Hot air for drying purposes at the final stage of the successive operations for the cans is supplied by means of a suction blower 130, operable by motor 131, which draws air through radiator 45, causing the air to be heated, and the air is then discharged through a manifold having can opening 132 and a cover opening 133. Suitable pans are disposed upon the lower base portion beneath the rotary carriage to catch the spray and condensation, and a drain pipe 134 is preferably provided from the pan disposed beneath the hot water spray. The soda solution tank 42 is provided with an overflow 135.

The operation of the machine will be quite apparent from the foregoing description. After the desired rest period adjustment has been made by the operator, the entire action with respect to speed and other features of operation, is entirely automatic and it is but necessary for the operator to insert cans and covers to be cleaned and remove the cleaned articles. The loading station is disposed one stage in advance of the preliminary warm water rinse, and therefore the door or opening in the hood is arranged to register with this station. After a can and cover have been loaded into the machine, the carriage travels or rotates in a step-by-step motion, and at each rest period the cans and covers are subjected to the successive washing, sterilizing or drying operations. The sequence of cleansing operations preferably remains constant, although this may be varied if desired, and the selective rest period control readily makes provision for longer or shorter washing periods, to meet various conditions.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A machine of the class described comprising, in combination, drive mechanism including a drive disc, a can carriage provided with a disc frictionally engaged with said drive disc, a stop member adapted to periodically engage said carriage to arrest the travel thereof, a rest period control member adapted to periodically engage and release said stop member, groups of cam elements upon said drive disc adapted to alternately actuate said control member, each of said groups operable at different intervals, and means for selectively bringing said control member into operable engagement with one of said groups.

2. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, an arresting member adapted to periodically engage said carriage, a rest period control member adapted to periodically engage and release said arresting member, and means for selectively controlling the frequency of the operation of said control member comprising means upon said drive mechanism adapted to engage said control member upon one revolution of said drive disc in one selected position and adapted to engage said control member twice upon each revolution of said drive disc in a second selected position and adapted to engage said control member three times upon each revolution of said drive disc in a third selected position.

3. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, an arresting member adapted to periodically engage said carriage, a rest period control member adapted to periodically engage and release said arresting member, means for selectively controlling the frequency of the operation of said control member comprising means upon said drive mechanism adapted to engage said control member upon one revolution of said drive disc in one selected position and adapted to engage said control member twice upon each revolution of said drive disc in a second selected position and adapted to engage said control member three times upon each revolution of said drive disc in a third selected position, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

4. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, an arresting member adapted to periodically engage said carriage, a rest period control member adapted to periodically engage and release said arresting member, and means for selectively controlling the frequency of the operation of said control member comprising three cam elements mounted upon said drive disc at equal radius and uniformly spaced and adapted to engage said control member three times upon each revolution of said drive disc in one selected position and a pair of cam elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc.

5. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, an arresting member adapted to periodically engage said carriage, a rest period control member adapted to periodically engage and release said arresting member, means for selectively controlling the frequency of the operation of said control member comprising three cam elements mounted upon said drive disc at equal radius and uniformly spaced and adapted to engage said control member three times upon each revolution of said drive disc in one selected position and a pair of cam elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

6. A rotary can washing machine comprising, in combination, a supporting frame, a vertically extending drive shaft journalled in said supporting frame and adapted in normal operation to rotate at uniform speed, a drive disc mounted upon the upper extremity of said drive shaft, a rotary can carriage having a driven disc adapted to engage said drive disc whereby the rotary travel of said carriage may be arrested independently of said drive disc, an arresting member adapted to periodically engage said carriage, a rest period control member adapted to periodically engage and release said arresting member, and means for selectively controlling the frequency of the operation of said control member comprising means upon said drive member comprising means upon said drive mechanism adapted to engage said control member upon one revolution of said drive disc in one selected position and adapted to engage said control member twice upon each revolution of said drive disc in a second selected position and adapted to engage said control member three times upon each revolution of said drive disc in a third selected position.

7. A rotary can washing machine comprising, in combination, a supporting frame, a vertically extending drive shaft journalled in said supporting frame and adapted in normal operation to rotate at uniform speed, a drive disc mounted upon the upper extremity of said drive shaft, a rotary can carriage having a driven disc adapted to engage said drive disc whereby the rotary travel of said carriage may be arrested independently of said drive disc, an arresting member adapted to periodically engage said carriage, a rest period control member adapted to periodically engage and release said arresting member, means for selectively controlling the frequency of the operation of said control member comprising means upon said drive mechanism adapted to engage said control member upon one revolution of said drive disc in one selected position and adapted to engage said control member twice upon each revolution of said drive disc in a second selected position and adapted to engage said control member three times upon each revolution of said drive disc in a third selected position, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

8. A rotary can washing machine comprising, in combination, a supporting frame, a vertically extending drive shaft journalled in said supporting frame and adapted in normal operation to rotate at uniform speed, a drive disc mounted upon the upper extremity of said drive shaft, a rotary can carriage having a driven disc adapted to engage said drive disc whereby the rotary travel of said carriage may be arrested independently of said drive disc, an arresting member adapted to periodically engage said carriage, a rest period control member adapted to periodically engage and release said arresting member, and means for selectively controlling the frequency of the operation of said control member comprising three cam elements mounted upon said drive disc at equal radius and uniformly spaced and adapted to engage said control member three times upon each revolution of said drive disc in one selected position and a pair of cam elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc.

9. A rotary can washing machine comprising, in combination, a supporting frame, a vertically extending drive shaft journalled in said supporting frame and adapted in normal operation to rotate at uniform speed, a drive disc mounted upon the upper extremity of said drive shaft, a rotary can carriage having a driven disc adapted to engage said drive disc whereby the rotary travel of said carriage may be arrested independently of said drive disc, an arresting member adapted to periodically engage said carriage, a rest period control member adapted to periodically engage and release said arresting member, means for selectively controlling the frequency of the operation of said control member comprising three cam elements mounted upon said drive disc at equal radius and uniformly spaced and adapted to engage said control member three times upon each revolution of said drive disc in one selected position and a pair of can elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

10. A rotary can washing machine comprising, in combination, a drive shaft provided with a drive disc, a rotary can carriage having a driven disc adapted to frictionally engage said drive disc whereby the rotary travel of said carriages may be arrested independently of said drive disc, a slidably mounted stop rod normally spring-pressed upwardly and adapted to periodically engage said carriage to arrest the travel thereof, a slidably and rockably mounted rest period control rod shiftable to three different positions and adapted to periodically engage and release said stop rod, and means for selectively controlling the frequency of the operation of said control rod comprising means upon said drive mechanism adapted to engage said control rod upon one revolution of said drive disc in one selected position and adapted to engage said control rod twice upon each revolution of said drive disc in a second selected position, and adapted to engage said control rod three times upon each revolution of said drive disc in a third selected position.

11. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, a slidably mounted stop rod normally spring-pressed upwardly and adapted to periodically engage said carriage to arrest the travel thereof, a slidably and rockably mounted rest period control rod shiftable to three different positions and adapted to periodically engage and release said stop rod, means for selectively controlling the frequency of the operation of said control rod comprising means upon said drive mechanism adapted to engage said control rod upon one revolution of said drive disc in one selected position and adapted to engage said control rod twice upon each revolution of said drive disc in a second selected position, and adapted to engage said control rod three times upon each revolution of said drive disc in a third selected position, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

12. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, a slidably mounted stop rod normally spring-pressed upwardly and adapted to periodically engage said carriage to arrest the travel thereof, a slidably and rockably mounted rest period control rod shiftable to three different positions and adapted to periodically engage and release said stop rod, and means for selectively controlling the frequency of the operation of said control rod comprising three cam elements mounted upon said drive disc at equal radius and uniformly spaced and adapted to engage said control member three times upon each revolution of said drive disc in one selected position and a pair of cam elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc.

13. A rotary can washing machine comprising, in combination, a drive shaft provided with a drive disc, a rotary can carriage having a driven disc adapted to frictionally engage said drive disc whereby the rotary travel of said carriage may be arrested independently of said drive disc, a slidably mounted stop rod normally spring-pressed upwardly and adapted to periodically engage said carriage to arrest the travel thereof, a slidably and rockably mounted rest period control rod shiftable to three different positions and adapted to periodically engage and release said stop rod, means for selectively controlling the frequency of the operation of said control rod comprising three cam elements mounted upon said drive disc at equal radius and uniformly spaced and adapted to engage said control member three times upon each revolution of said drive disc in one selected position and a pair of cam elements mounted upon said drive disc at equal but less radius than said three cam elements and diametrically opposite and adapted to engage said control member twice upon each revolution of said drive disc in a second selected position and a single cam element mounted upon said drive disc at less radius than said pair of cam elements and adapted to engage said control member once upon each revolution of said drive disc, cleansing devices disposed circumferentially upon said machine, a plurality of fluid supply valves for controlling the supply of fluid to said cleansing devices, a pivotally mounted plate member constructed and arranged to operate said valves, and means upon said carriage for actuating said plate member to open said valves during each rest period of said carriage.

In testimony whereof I have signed my name to this specification.

CHARLES F. McEWAN.